United States Patent Office 2,814,075
Patented Nov. 26, 1957

2,814,075

METHOD OF TREATING WASTE LATEX FOAM

Paul J. Dasher, Willoughby, Ohio, assignor to Dasher Rubber & Chemical Company, Fairport Harbor, Ohio, a corporation of Ohio No Drawing. Application September 8, 1954, Serial No. 454,852

11 Claims. (Cl. 18—48)

This application is a continuation-in-part of my copending application Serial No. 425,039, filed April 22, 1954.

This invention relates to the treatment of waste or scrap foamed latex for the purpose of converting such waste or scrap into useful products.

In the production of sponge rubber products, the customary commercial procedure entails the foaming of the rubber latex, followed by gelling or coagulation of the foamed latex in suitable molds, whereupon the gelled latex is dried and vulcanized.

The foaming of the latex is accomplished by mechanical introduction of air thereinto, or by the generation of gas in situ, until a foam of the desired volume is obtained. The volume of the foamed latex may be from three to twelve or more times that of the starting latex.

In commercial practice for the production of sponge rubber products, particularly those in which the foam is formed in situ by inter-action of gas-producing reactants, the presence of these reagents, as well as others required to be present, introduces variables that are difficult to control. As a result, "blowing" of the latex frequently occurs in the foam-forming stage. Likewise, in the subsequent stage of gelling the foam, there often occurs undesirable collapse of the foam. These and other difficulties encountered in operation have resulted in accumulation of large amounts of waste foam rubber in the industry.

It has heretofore been proposed to recover this waste material for secondary uses, which necessarily entail first drying it. Since it contains usually not less than about 35% by weight of water, the cost of drying the same by the usually available methods is not economically feasible.

The principal object of the invention is to provide a method whereby such waste or scrap wet latex foam or sponge may be economically treated and converted into useful rubber products.

I have found that notwithstanding the relatively high water content of this waste or scrap material, it may be readily transformed, in accordance with the invention, into finely divided powders that find ready usefulness in a variety of industrial fields.

The latex foams which may be treated in accordance with the invention include those made from natural as well as synthetic latices or mixtures thereof. The term "latex foam" herein is to be understood to mean a partly or wholly coagulated foam of aqueous dispersion or latex of a rubber or rubber-like substance, including natural and synthetic, as well as reclaim rubber, unvulcanized or partially pre-vulcanized. The synthetic rubbers may be polychloroprene, butadiene copolymers, for example butadiene-styrene and butadiene-acrylonitrile, as well as polyvinyl chloride, and other similar rubbery polymeric substances.

Briefly, according to the invention, the wet scrap latex foam or sponge may be reduced to the form of finely divided powder by treating it under certain conditions, as will be hereinafter more fully set forth, in a Banbury machine.

The Banbury machine has long been known and used in the rubber industry for masticating raw or unvulcanized rubber, as well as for mixing and compounding the same with fillers, vulcanizers, and other compounding agents. The machine comprises essentially a pair of bladed rotors mounted for rotation adjacent one another in opposite directions within semi-cylindrical troughs or chambers, the rotors being so shaped as to smear the material in the chambers against the walls thereof, forcing it upwardly and kneading it as it moves toward the longitudinal center of the machine from one chamber to the other, the material being held within the sphere of action of the bladed rotors by a pneumatically operated ram. The general construction of the Banbury machine in the form in which it has been extensively employed in the rubber industry for breaking down or masticating rubber and for compounding the same with fillers, etc., is shown, for example, in the Banbury patent, 1,881,994.

By my invention, the scrap sponge or latex foam may be reduced by means of the Banbury machine to the form of relatively finely divided powders of a fineness within the range of 40 to 200 mesh, the particles being dry and non-sticky relative to one another so that the powder is readily pourable.

In producing the powdered rubber from the wet latex foam according to the invention, a suitable quantity thereof, in the form of chunks or pieces is loaded into the Banbury machine and subjected to the intense shearing action of the bladed rotors while exerting mechanical pressure on the mass to compact and densify it to such an extent that the shearing action rapidly brings about a high input of mechanical energy.

During the stage at which this high input of mechanical energy occurs, the temperature of the mass is held to a maximum level such as to prevent the occurrence of agglomeration between the particles as they are being formed by the grinding action that occurs under these conditions. The heating of the mass resulting from high input of mechanical energy is sufficient rapidly to convert the water into vapor or steam. So long as significant amounts of water are present, the temperature of the mass will be largely dependent upon the developed steam pressure. The steam must, of course, be allowed to escape from the working chamber in order to prevent the steam pressure from exceeding the pressure by which the ram holds the material under mechanical compression within the chamber. At any rate, the temperatures attained by the material are sufficient to vulcanize the rubber contained therein or more fully to vulcanize the previously partially prevulcanized rubber content thereof.

Although the machine may be provided with suitable auxiliary means to facilitate the escape of the steam generated from the water contained in the material undergoing treatment, escape of some steam takes place partially at least through the clearances between the sides of the ram and the walls of the throat or neck of the machine in which the ram operates, and may be facilitated by lifting the ram at suitable time intervals.

The maximum temperature to which the mass is permitted to rise will ordinarily not exceed the range of 270° to 330° F., although in most instances temperatures of the order of 280° to 300° F. should be the maximum which the mass is permitted to attain.

The temperature figures stated herein are based upon measurements with electronic recorders. These are believed to be more accurate readings than those recorded by the usual Wheatstone bridge circuit. Hence, these figures may be somewhat different than when taken by such usual methods, and may vary somewhat according to the size or functioning of the particular Banbury machine employed.

In general, it may be stated that the temperature of the mass during the grinding stage in the Banbury machine should be held at a level below that at which substantial agglomeration of sub-divided particles will occur during the continued action of the machine within the time cycle of operation. By operating in this manner, I have found it possible to convert waste or scrap latex foam into finely divided powders within a cycle of operation of the order of about two to ten minutes in the Banbury machine when operated under the conditions set forth.

In actual practice, I have found that by pumping water at a temperature of, say, 45° to 55° F., at a sufficient velocity through the jacketed walls of the working chamber, as well as through the interior of the rotors, it is possible to prevent the temperature of the material undergoing treatment from rising above the stated maximum, when the machine is operated under the power input conditions hereinafter set forth. In this way, the Banbury machine may be caused to operate upon latex foam in a manner to yield powdered vulcanized rubber of the order of fineness herein set forth.

The velocity of the cooling water will depend in general upon the rate at which the temperature of the material rises under the influence of the mechanical input of energy by the action of the rotors thereon, and upon the rate of heat transfer occurring on the one hand between the material undergoing treatment and the metal walls of the chamber and rotors, and on the other hand, between the metal walls and the water in the jacket and rotors.

The principal factor of control, therefore, in treating the latex foam is to insure that after it has attained temperatures sufficiently high to vulcanize the rubber contained therein, the intense shearing action thereafter exerted upon the material will not cause its temperature to rise to a point at which there ensues such a substantial degree of softening of the rubber during its progressive reduction to the form of fine particles by the mechanical action of the rotors, as will bring about substantial agglomeration of sub-divided particles.

In operation, the rotors of the machine may be driven at a speed of 50 to 100 R. P. M., while at the same time the mass is held in the working chamber under mechanical compression by the ram. The mechanical pressure thus exerted on the material by the ram may be of the order of 150 to 200 pounds per square inch, desirably 170 pounds per square inch.

In general, the conditions of operation will be such as to bring about a power input averaging from 0.7 to 3 or more horsepower per pound of material being treated. It will be understood that these stated average figures take into account the relatively lower power input during that portion of the operating cycle in which it may be necessary to lift the ram momentarily in order to permit rapid escape of steam generated from the water originally contained in the batch.

Utilizing, for example, a size 3A Banbury machine having a ram the area of whose working surface is 252 square inches, the pneumatic cylinder for operating the ram is made to have an inside diameter of 16 inches, i. e., a cross-sectional area of approximately 201 square inches, or more. Consequently, by using air or hydraulic pressure of say 200 pounds per square inch in the cylinder, the ram may be caused to exert a mechanical pressure of at least 160 pounds per square inch upon the material in the working chamber of the machine.

The latex foam used in the practice of the invention contains generally about 35% by weight of water. When a suitable size batch of this material has been loaded into the working chamber of the machine and the ram has been lowered, a substantial portion of the original water content will be squeezed mechanically therefrom by the force of the ram, and will escape at the bottom of the chamber through the discharge door of the machine. Some of the water expressed from the mass may rise above the ram, and its removal may be facilitated by connecting a suitable aspirator at that point, thereby preventing the formation of a water seal which would retard escape of steam from the mass in the working chamber.

The full pressure of the ram may be applied and the mass of material in the chamber thereby compacted to the degree required after the batch has become dried by elimination of its water content, for enabling the rotors to exert a grinding effect and reduce the rubber to a powder of the desired mesh size within a matter of several minutes of operation.

To that end, in determining the optimum size of the starting batch, due account should be taken of the reduction in its volume by reason of elimination of the water content thereof. If less than the optimum quantity is used as the starting batch, the air pressure utilized in the cylinder for operating the ram may lower the ram to the point where it engages the limit stops in the neck or throat of the machine, particularly after the sponge has been dried. Under such conditions, the ram will not be exerting its full effect upon the material in the working chamber of the machine, with the result that there is a reduction in energy input necessary to obtain the shearing action required for reducing the material to the desired powdered condition. On the other hand, if more than the optimum quantity is initially loaded into the machine, portions of the mass may be trapped or may otherwise extend far enough up into the throat or neck of the machine during the operating cycle so as not fully to receive the effect of the shearing action, with the result that the product will not possess the desired finely divided condition.

The quantity of the starting batch, for a machine of any given cubic contents of working space (including the space in the working chamber and in the throat or neck to a distance about one-half inch below the ram stops) may readily be calculated from its specific gravity. Alternatively, it may be determined empirically from screen analyses of the powder obtained when using various initial quantities of the starting material, with any given speed of the rotors, ram pressure and time of treatment. Likewise, the optimum time of treatment for any given speed of the rotors, ram pressure and size of batch, may be determined empirically from screen analyses of the resultant powders.

In general, it may be stated that with a size 3A Banbury, operated with a 600 horsepower motor, at a rotor speed of 50 R. P. M., the starting batch will amount to from 150 to 165 pounds.

The normally available varieties of latex foam have a rubber hydrocarbon content of the order of 95% by weight. In the practice of the invention it is desirable that there be present substantial proportions of finely divided mineral or other solid non-rubber substances capable of functioning as attriting agents in the process. I find that the presence of effective amounts of such substances during the operation results in greater yield of finer mesh powder from a given starting batch of latex foam than is otherwise the case.

Among the substances that may thus be utilized as attriting agents in the process are whiting, carbon black, and the like. Preferably, these are initially charged into the machine in suitable quantities along with the latex foam.

Specifically illustrating the invention when utilizing a size 3A Banbury machine constructed and arranged to operate under the conditions above stated, a rubber product in the form of vulcanized powder of a fineness such that more than 30% passed a 40 mesh screen and not more than about 25% is retained on a 20 mesh screen, was obtained with a starting batch composed of 145 pounds of latex foam made from a GRS latex and having a water content of 35% by weight, together with ten pounds of colloidal calcium carbonate. The conditions prevailing in 20 separate runs on batches composed as aforesaid are shown in the following tabulation:

| Batch | Cycle in Minutes | Maximum Temperature | Average H. P. per Pound |
|---|---|---|---|
| 1 | 9.5 | 267 | 1.27 |
| 2 | 8.5 | 288 | 1.11 |
| 3 | 10.0 | 265 | 1.19 |
| 4 | 8.5 | 262 | 1.06 |
| 5 | 10.0 | 245 | .78 |
| 6 | 11.0 | 249 | 1.21 |
| 7 | 15.0 | 270 | .74 |
| 8 | 8.5 | 267 | 1.20 |
| 9 | 7.5 | 267 | .77 |
| 10 | 8.0 | 275 | 1.39 |
| 11 | 9.0 | 262 | .99 |
| 12 | 7.5 | 230 | .70 |
| 13 | 8.5 | 240 | .64 |
| 14 | 9.0 | 270 | 1.06 |
| 15 | 9.5 | 290 | 1.73 |
| 16 | 8.5 | 251 | 1.01 |
| 17 | 8.5 | 265 | .99 |
| 18 | 10.0 | 257 | .97 |
| 19 | 8.0 | 251 | .84 |
| 20 | 9.0 | 277 | 1.27 |

In the above tabulation, the figures for the operating cycle (time in minutes) include the time required to load each successive batch into the machine and time elapsed before the water had been eliminated, enabling the full pressure of the ram to be exerted. The actual time of grinding, which occurs as above stated, in the later stages of the operating cycle, consumes not more than about two-thirds, and in some cases as little as one-third of the total time cycle.

Screen analyses of powders obtained from three batches treated in accordance with the method, are as follows:

| Screen U. S. No. | Batch A | | Batch B | | Batch C | |
|---|---|---|---|---|---|---|
| | Percent Retained | Percent Cumulative | Percent Retained | Percent Cumulative | Percent Retained | Percent Cumulative |
| 12 | 11.40 | 11.40 | 5.72 | 5.72 | 11.76 | 11.76 |
| 16 | 8.03 | 19.43 | 3.10 | 8.82 | 5.75 | 17.51 |
| 20 | 6.61 | 26.04 | 3.15 | 11.97 | 5.88 | 23.39 |
| 40 | 35.42 | 61.46 | 10.93 | 22.90 | 47.03 | 70.42 |
| 50 | 34.05 | 95.51 | 59.72 | 82.62 | 25.79 | 96.21 |
| 70 | 3.54 | 99.05 | 15.94 | 98.56 | 2.35 | 98.56 |
| Pass | 0.94 | 99.99 | 1.42 | 99.98 | 1.44 | 100.00 |

The particular variety and amount of extraneous attriting agents employed in conjunction with the latex foam for securing the ground products of the invention will be governed by the nature of the latex foam, the physical properties of the attriting agent, and the functioning of the particular machine employed. For any given kind of latex foam to be treated in a particular machine, the results will depend largely upon the particle size of the agent and to some extent upon the shape of its particles. The chief factor, however, appears to be the actual surface area presented per unit weight and/or per unit volume. If the attriting agent is one having a relatively high specific gravity, there will be less surface area per unit of weight thereof than in the case of one having a considerably lower specific gravity. In general, it may be stated that an attriting agent of the character of colloidal calcium carbonate, carbon black, or the like, in amounts in the range of approximately 5 to 15 percent by weight of the batch will facilitate securing the powdered rubber product of the invention.

In the operation of the process, the occurrence of agglomerates in the product may be taken as an indication that the optimum grinding stage has been passed, due either to an excessive cycle of operation, or to excessive speeds of the rotors, or to inadequate rate of heat transfer between the material undergoing the treatment and the jacket and rotors of the machine, or to a combination of any two or more of these factors, since all of these factors contribute in greater or lesser measure to the conditions which give rise to formation of agglomerates of otherwise finely divided particles obtained under optimum conditions.

The powdered rubbers produced as hereinabove described exhibit unique and unexpected properties which, so far as I am aware, are not possessed by any of the varieties of ground rubber known prior to my invention. As above set forth, the powders produced in accordance herewith possess properties of vulcanized rubber. This is evidenced by the fact that no additional quantities of curing agents are necessary in the use of the product. This may be taken as an indication that the sulphur bond in the molecule of the rubber has not been materially altered in the grinding stage of the process, and this is evidently one result of conducting that stage at temperatures below the maximums set forth, for when the temperature of the operation is permitted substantially to exceed such maximums, plasticization or de-vulcanization of the rubber hydrocarbon occurs to an extent sufficient to bring about agglomeration of the particles to a degree depending largely upon the temperature to which the mass is permitted to rise.

While exhibiting the aforesaid characteristics of vulcanized rubber, however, the ground rubber products of the invention, at the same time, exhibit properties or characteristics similar to and ordinarily associated with de-vulcanized rubber in respect of ease of solution in common rubber solvents, not ordinarily characteristic of vulcanized rubber. This relative ease of solution of the powders is evidently not the function merely of the state of subdivision of the particles, inasmuch as the rate of solution is higher than that of commercially available grades of powdered vulcanized rubber. The ground rubber products of the invention should be expected to exhibit no higher rate of solution than such normally available varieties of powdered rubber of the same particle size distribution. Yet the rate and total swell of volume of the rubber powders obtainable by my invention are substantially higher than in the case of the presently available varieties of powdered rubber.

The ease of solution of the powdered product of my invention as indicated by the total percent volume of the swell of selected mesh sizes in normal heptane, compared with portions of the same mesh size selected from commercially available rubber powders made by conventional grinders such as the so-called Susan and the Cumberland grinders, is shown in the following tabulation:

| | Applicant's Powder | Commercial Black Mechanical Scrap | Commercial No. 1 Peels-Buffings | Commercial Latex Sponge |
|---|---|---|---|---|
| 20 Mesh | 1,100 | 460 | 200 | 275. |
| 40 Mesh | 1,600 | 500 | 220 | Not Commercially Available. |
| 60 Mesh | 1,700 | 520 | 230 | Do. |
| 80 Mesh | 1,900 | 570 | 230 | Do. |
| 100 Mesh | solution gel | 720 | 260 | Do. |

Whether this anomalous property of rubber powders produced in accordance with the invention is due to some partial weakening of the sulphur bond in the rubber hydrocarbon molecule, or whether it is due to some other chemical or physical effect, encountered in the treatment, I am not at present prepared to say. At any rate, this anomalous property of the powdered rubbers of the invention renders them suitable for numerous uses whereain this property is of considerable advantage.

The powders obtained in accordance with the invention from wet latex foam find usefulness for a variety of industrial purposes. Among these may be mentioned their use as compounding agents, and the like.

Still another valuable use of the powders obtained by my invention is as a starting material for the production of reclaimed or de-vulcanized rubber by any of the conventional reclaiming processes. Because of the finely divided character of the powders, they would serve with great advantage as the raw material for rubber reclaiming processes, such as the known alkali or acid digestion processes, the so-called pan method of reclaiming rubber in autoclaves, and other known reclaiming processes. In all such processes, the effectiveness of the so-called reclaiming agents and softeners usually employed is enhanced by using, as the starting material, the finely divided powders of the present invention.

As will be understood, of course, if it is desired to utilize for any particular purpose, only those portions of the product which are of selected mesh size, say only such as will all pass through 70 mesh, or through 100 mesh, these portions may readily be segregated by sieving through screens of the selected mesh size.

Having described my invention, what I claim is:

1. A process of treating wet, coagulated, substantially unvulcanized latex foam, which comprises subjecting the same to an intense shearing action while held under mechanical compression sufficient to develop an energy input averaging not less than about 0.7 horsepower per pound of material being treated over a period of time of the order of 2 to 10 minutes whereby to cause said mechanical action to reduce the mass to the form of finely divided particles, and maintaining the mass during such treatment at temperatures sufficiently low to prevent occurrence of substantial agglomeration of subdivided particles.

2. A process as defined in claim 1, wherein said treatment of the latex foam is carried out in the presence of a substantial quantity of an added attriting agent.

3. The process of claim 1, wherein said attriting agent is calcium carbonate.

4. A process as defined in claim 1, wherein said temperature is not substantially in excess of 330° F.

5. A process of treating wet, coagulated, substantially unvulcanized latex foam, which comprises charging a batch of the foam into a working chamber, subjecting it to mechanical compression and heat in said chamber sufficient to eliminate the water contained therein, subjecting the substantially water-free mass in said chamber to intense shearing action while held under mechanical compression sufficient to develop an energy input averaging not less than about 0.7 horsepower per pound of material being treated over a period of time of the order of 2 to 10 minutes whereby to cause said mechanical action to reduce the mass to the form of finely divided particles, and maintaining the mass during such treatment at temperatures sufficiently low to prevent occurrence of substantial agglomeration of subdivided particles.

6. A process as defined in claim 1, wherein the said energy input results from the described treatment of the latex foam in a Banbury machine.

7. A process as defined in claim 6, wherein said temperature is maintained by pumping cooling fluid through the jacketed walls of the working chamber and through the interior of the rotors.

8. A process as defined in claim 1, wherein the said energy input results from the described treatment of the latex foam in a Banbury machine.

9. A process as defined in claim 7, wherein cooling fluid is pumped through the jacketed walls of the working chamber and through the interior of the rotors at a velocity, in relation to the rates of heat transfer from the mass to said walls and from the latter to said cooling fluid, such as to prevent the temperature of the mass from exceeding about 330° F. during said treatment.

10. A process of treating wet, coagulated, substantially unvulcanized latex foam, which comprises subjecting the same to an intense shearing action while held under mechanical compression sufficient to develop an energy input averaging not less than about 0.7 horsepower per pound of material being treated over a period of time of the order of 2 to 10 minutes whereby to cause said mechanical action to reduce the mass to the form of finely divided particles, and maintaining the mass during such treatment at temperatures not substantially in excess of 330° F.

11. A process of producing powdered rubber such that 30% passes a 40-mesh screen from a single operation which comprises subjecting coagulated, substantially unvulcanized latex foam to an intense shearing action while held under mechanical compression sufficient to develop an energy input averaging not less than about 0.7 horsepower per pound of material being treated over a period of time of the order of two to ten minutes and maintaining the mass during such treatment at temperatures not in excess of 330° F.

References Cited in the file of this patent

UNITED STATES PATENTS

| Number | Name | Date |
|---|---|---|
| 1,828,365 | Geyer et al. | Oct. 20, 1931 |
| 2,412,586 | Knowland | Dec. 17, 1946 |
| 2,461,193 | Banbury et al. | Feb. 8, 1949 |
| 2,535,931 | Kelly | Dec. 26, 1950 |
| 2,582,327 | Haine | Jan. 15, 1952 |
| 2,617,775 | Newberg et al. | Nov. 11, 1952 |
| 2,617,782 | Paton et al. | Nov. 11, 1952 |

U. S. DEPARTMENT OF COMMERCE
PATENT OFFICE

CERTIFICATE OF CORRECTION

Patent No. 2,814,075                      November 26, 1957

Paul J. Dasher

It is hereby certified that error appears in the printed specification of the above numbered patent requiring correction and that the said Letters Patent should read as corrected below.

Column 8, line 10, for the claim reference numeral "1" read -- 5 --.

Signed and sealed this 11th day of March 1958.

(SEAL)
Attest:

KARL H. AXLINE
Attesting Officer

ROBERT C. WATSON
Commissioner of Patents